(12) United States Patent
Prutkin

(10) Patent No.: US 6,773,590 B2
(45) Date of Patent: Aug. 10, 2004

(54) FILTERING MEMBRANES ON THE BASIS OF WELDED POLYMER STRUCTURES AND METHOD FOR MANUFACTURE THEREOF

(75) Inventor: Vladimir Prutkin, San Francisco, CA (US)

(73) Assignee: Alexander Shkolnik, San Carlos, CA (US); part interest ( * ) Notice: Subject to any disclaimer, the term of this patent is extended or adjusted under 35 U.S.C. 154(b) by 155 days.

(21) Appl. No.: 10/058,157

(22) Filed: Jan. 29, 2002

(65) Prior Publication Data
US 2003/0150790 A1 Aug. 14, 2003

(51) Int. Cl.[7] .............................................. B01D 63/00
(52) U.S. Cl. ............................ 210/321.75; 210/500.21; 210/321.84; 210/488; 156/250; 156/269; 55/529; 96/11
(58) Field of Search ................................ 210/650–654, 210/636, 767, 510.1, 321.75, 321.8, 242.3, 488; 428/155, 166, 178, 190, 200, 320.2; 55/529, 381; 96/6, 7, 9, 11; 95/45; 427/244; 422/101

(56) References Cited

U.S. PATENT DOCUMENTS

| | | | |
|---|---|---|---|
| 5,500,247 A | 3/1996 | Hagqvist | |
| 6,177,011 B1 | 1/2001 | Hachisuka et al. | |
| 2002/0176804 A1 * | 11/2002 | Strand et al. | 422/100 |
| 2002/0185431 A1 * | 12/2002 | Karp | 210/488 |

FOREIGN PATENT DOCUMENTS

JP 2001-129329 5/2001

OTHER PUBLICATIONS

S. Loeb and S. Sourirajam Publication of UCLA Dept. of Eng. Rep. 60– [1960].

* cited by examiner

Primary Examiner—W. L. Walker
Assistant Examiner—Krishnan S Menon

(57) ABSTRACT

The filtering membranes of the present invention are made from a pair of polymer films stretched in a liquid surface-active medium for the formation of crazes filled with the aforementioned medium. The crazed films are perforated and then stack together in a stretched or released state and are welded together into a sealed structure with a plurality of parallel welding seams arranged, e.g., in mutually perpendicular directions, so that a plurality of sealed cells is formed. The cells have on one side of the membrane input openings and on the other side output openings. If an input opening is in one cell, then an output opening is in the adjacent cell. Adjacent cells are interconnected only through the welding seams. Welding can be carried out by contact heating or with the use of a laser beam, or the like. The material of the welding seam has an amorphous structure. The substance captured inside the crazes may comprise a dispersion medium used for fixing dimensions of the crazes or a substance for treating the fluid being filtered. In operation, the medium to be filtered diffuses from the input cells to the output cells of the membrane through the material of the welding seams. Filtering is enhanced if the material of the seams has aforementioned crazes. In such a membrane, the total length of the welding seams on the area of 1 $m^2$ may reach several hundred thousand meters. The membrane possesses selectivity sufficient for separation of two or multiple-component mixtures in a single-stage process. Depending on the method used for preparation of the polymer-film surface prior to welding, the membrane filter may have efficiency from 5 to 40,000 $kg/m^2 \times D$.

12 Claims, 3 Drawing Sheets

FILTERING MEMBRANES ON THE BASIS OF WELDED POLYMER STRUCTURES AND METHOD FOR MANUFACTURE THEREOF

FIELD OF THE INVENTION

The present invention relates to filtering membranes on the basis of welded polymer structures and to a method for manufacture such membranes. The membranes of the present invention are intended for separation of liquid and gaseous mixtures and may find application in chemical industry, bioengineering, medicine, food industry, etc.

BACKGROUND OF THE INVENTION

At the present time, separation of liquid and gaseous mixtures with the use of separation membranes find wide application in various industries. Thus, such membranes are used in the chemical industry for separation of azetropic mixtures, cleaning and concentration of solutions, cleaning and isolation of high-molecular compounds from solutions that contain low-molecular components, etc. In bioengineering the separation membranes are used for isolation of active substances, such as vaccines and ferments. In food industry such membranes find application in the production of juice concentrates, milk, and high-quality sugar. In oil industry the separation membranes are used for separation of gaseous products from wastes for synthesis of polymers. Other fields for efficient use of separation membranes are treatment of water and solutions, purification of potable water and sewages, etc.

One of greatest achievements in the development of membrane technique was a membrane method for desalination of sea water invented by S. Loeb and S. Sourirajan in 1960 (S. Loeb and S. Sourirajan, UCLA Dept. of Eng. Rep. 60-60 [1960]). This method (hereinafter referred to as L-S method) determined for many years the strategy in development of membrane production technology. The authors of this method, S. Loeb and S. Sourirajan, were awarded a Nobel Prize. Many years of experience gained in the improvement of the original L-S method are reflected in many patents and publications. The double-layered structure proposed by S. Loeb and S. Sourirajan was composed of a thin dense cellulose acetate film applied onto a thin porous substrate. The upper dense layer with a thickness not exceeding 1 $\mu$m possessed selectivity to water and therefore allowed isolation of sodium chloride therefrom. The porous substrate with a thickness exceeding 100 $\mu$m imparted mechanical strength to the structure. If both layers are made from the same polymer, the membranes are called anisotropic membranes (AM), and if they are made of different materials the membranes are called composite membranes (CM). Depending on their shapes, the membranes can be flat, spiral, tubular, or in the form of hollow fibers (First Demonstration of Reverse Osmosis by UCLA SEAS. See in Internet: http://www.engineer. Ucla. Edu/history/osmosis. Html).

Modern membranes comprise thin hollow fibers with the walls made from a porous material without any selectivity. Selectivity is acquired by coating the membrane walls with another material, which possesses selectivity and determines productivity of the membrane operation.

Processes of membrane separation of fluids, which find industrial application, are the following: microfiltration, ultrafiltration, and reverse osmosis. These processes are realized with the use of semipenetrable two-layered membranes produced in the form of AM and CM structures with different sizes of pores.

Microfiltration retains particles in the range of 0.1 to 10 microns (1,000 to 100,000 Angstroms). Particles in this range, such as paint pigments or bacteria, are retained and concentrated by the membrane. Microfiltration can be used to remove bacteria and small suspended solids or clarify beverages.

Ultrafiltration retains particles in the range of 0.001 to 0.1 microns (10 to 1000 Angstroms). Protein and sugar molecules are in this size range. Ultrafiltration can be used to reduce the biochemical oxygen demand (BOD) of waste water by removing substances such as sugar. Ultrafiltration can also be used to separate oil from waste water so that the oil may be recycled.

Reverse osmosis makes it possible to retain particles as small as 0.001 microns (10 Angstroms) or smaller. It also retains ionic substances such as dissolved salts or metal ions, Reverse osmosis can be used to concentrate rinse water from plating operations. The concentrated rinse water then can be used to replenish the plating bath.

It is known that porosity of membrane produced in accordance with the L-S method has the following values expressed in percentages: microfiltration—70%; ultrafiltration—60%; reverse osmosis—50% (Ralph E. White, Peter N. Pintarno. Industrial Membrane Processes: AIChE Symposium Series. American Institute of Chemical Engineers, 1986, 82, No. 248, pp. 98–108, 255–262).

As can be seen from the above, that only a part of the membrane volume is active, and the smaller the dimensions of pores, the smaller is the active volume of the membrane. This is because the L-S method has limitations with regard to distribution of pore density, and the pores themselves have arbitrary distribution. More specifically, the structure of polymer membranes consists of crystalline and amorphous zones, and structural stability of such membranes depends on links between molecular chains inside the crystalline areas, whereas filtration of a substance occurs mainly through more porous amorphous zones. In microporous membranes filtration occurs through the interlinked pores inside the membrane. Thus, if efficiency of a membrane is determined in terms of its porosity, the arbitrary nature of porosity distribution can be considered as an additional contribution to decrease in membrane's efficiency because of twisting and elongation of the diffusion path. In actual membranes, the diffusion path is much longer than the membrane thickness. The L-S method in principle does not allow to increase the amorphous part in the volume of the active zone of the membrane or to make it comparable with the membrane thickness and thus to improve permeability. This is an essential disadvantage of the L-S method.

Another disadvantage of double-layered L-S membranes consists in that the porous substrate shields the active zone of the membrane and reduces its working area. Even though in many cases porosity of the permeable substrate is much higher than that of the active zone of the membrane, as one of the separable components is removed from the system, a relatively thick substrate presents a significant resistance to the transfer process.

Let us consider some particularities inherent in the manufacture of membrane filters by he L-S method.

AM and CM for Reverse Osmosis—Reverse osmosis can be carried out with both AM (on the basis of cellulose ethers, polyamides, and polysulfones) and CM (on the basis various polymers on substrates from polysulfone or polyethyleneterephalate). An AM membrane of this type consists of a substrate having a thickness of about 100 microns and an active layer having a thickness of about 0.2 microns. The membrane is produced by a dry, spontaneous, or a wet coagulation method (see E. Drioli, M. Nakagani. Membranes and Membrane Processes. N-Y.; Plenum Press, 1986, p. 115–187). In the dry method, a polymer, e.g., a cellulose ether or an ether mixture, is dissolved in a solvent, such as acetone. The solution is combined with pore-forming agents, water, and glycerol.

The solution is poured onto a substrate, and the solvent is gradually evaporated. In the wet method, the solution, which contains polymer such as a cellulose acetate, a pore-forming agent (magnesium perchrorate), water, and an organic solvent (acetone, methylethylketone, and methyl or ethyl alcohol), is applied in the form of a thin layer onto a glass or metal plate. Prior to application, the solution and the plate are cooled in a cooling chamber to a temperature from −8° C. to −16° C. After application of the solution, the plate is dried for several minutes and is immersed in cold water (0° C.). Following 1 hour retention in cold water, the solution is washed out from the coating and the coating is gelatinized. The film with an anizotropic structure, i.e., a thin surface layer on a microporous substrate, is removed. The longer the solvent evaporation time, the thicker is this active layer.

Disadvantages of the membrane manufacturing process described above are a multiple-state processing, difficulties of control, the use of organic solvents, and difficulties of cleaning the membranes.

At the present time, CMs consisting of a 75-micron thick porous substrate and a thin (300 to 1000 Angstrom) active layer find wide practical application. Substrates used in such membranes are made mainly of polyethyleneterephthalate and ppolysulfone. The membranes are produced by polycondensation of the monomer mixture on a porous substrate (see R.E. Kesting. Synthetic Polymer Membranes. N.Y.; John Wiley and Sons, 1985, p. 29–41).

KMs of another version consist of a sulfonated polyfurane on a substrate from a sheet of microporous polysulfone. The substrate is produced by passing a polysulfone solution through an orifice into a coagulation bath. The sulfonated polyfurane is applied in the second stage of the process in the following manner. The substrate is coated with a composition that contains a furfural alcohol, sulfuric acid, a polyethyloxide isopropanol, and water. Slow heating to 150° C. causes cross-linking and formation of a non-soluble sulfonated polyfurane. A disadvantage of such membranes consists in complicated and difficult manufacture.

All known membranes described and criticized above are structurally the same and differ from each other only by materials, methods of manufacture, and porous structures. For illustration of specific structures of known membranes we can refer to several patents listed below.

U.S. Pat. No. 6,177,011 issued in 2001 to H. Hachisuka discloses a composite reverse osmosis membrane having a separation layer with polyvinyl alcohol coating. The membrane has a high salt rejection, a high water permeability, and a high fouling tolerance, and permits practical desalination at a relatively low pressure. The membrane is provided by coating the surface of a reverse osmosis membrane of aromatic polyamide with polyvinyl alcohol (PVA), for example, and controlling the surface zeta potential of the separation layer within.+0.10 mV at pH 6. This reverse osmosis composite membrane is electrically neutral and controls the electrical adsorption of membrane-fouling substances having a charge group present in water. Next, the embodiments of the present invention will be described below with reference to the drawings. The membrane consists of a supporting porous layer, a separation layer applied onto the porous layer, and a thin protective layer of polyvinyl alcohol as the surface layer of the separation layer.

U.S. Pat. No. 5,500,247 issued in 1996 to P. Hagqvist describes a web-like starting material formed by combining mutually two webs of membrane-layer carrier sheets and an intermediate web of the spacing layer or sheet. The starting material may also include only one web, which comprises two outer carrier layers that are integrated with an inner spacing layer. In the latter cases, the starting material web will suitably include a thermoplastic fiber fabric for the spacing layer, wherein the outer carrier layers are formed by heat-treating the surface of the fiber fabric in a manner to obtain a densified carrier structure adapted for the application of the membrane layer.

Japanese Laid-Open Patent Application No. 2001-129329 issued in 2001 to K. Nagatsuka describes a reinforcing material for a polytetrafluoroethylene (PTFE) membrane filter which flame resistant and consists of a porous reinforced web and a thin PTFE film.

Although the aforementioned structures differ from each other by construction of various elements, all of them have an active member of the membrane blocked by a support or protection member, to which the membrane film is attached by gluing, fusing, or welding.

OBJECTS AND SUMMARY OF THE INVENTION

It is an object of the present invention to provide membranous filters which have controlled distribution and orientation of pores, short filtration paths, efficient operation, simple construction, and low cost. Another object is to provide filtering membranes, which can be manufactured in a single-stage process. Another object is to provide a simple single-stage method for manufacturing the aforementioned membranes.

The filtering membranes of the present invention are made from a pair of polymer films stretched in a liquid medium for the formation of crazes filled with the aforementioned medium. The crazed films are perforated and then stack together in a stretched or released state and are welded together into a sealed structure with a plurality of parallel welding seams arranged, e.g., in mutually perpendicular directions, so that the seams form a plurality of cells. Each aforementioned perforation is arranged in each cell so that perforations of one film alternate with perforations of another film. In other words, the membrane formed by the aforementioned method consists of a plurality of sealed cells having on one side of the membrane perforations opened to the input side of the membrane and with perforations on the other side of the membrane open to output side of the membrane. Adjacent cells are interconnected only through the welding seams.

Welding can be carried out by contact heating or with the use of a laser beam, or the like. The substance captured inside the crazes may comprise a dispersion medium used for fixing dimensions of the crazes or a substance for treating the fluid being filtered. In operation, the medium to be filtered diffuses from the input cells to the output cells of the membrane through the material of the welding seams. Filtering is enhanced if the material of the seams has aforementioned crazes. In such a membrane, the total length of the welding seams on the area of 1 $m^2$ may reach several hundred thousand meters. The membrane possesses selectivity sufficient for separation of two or multiple-component mixtures in a single-stage process. Depending on the method used for preparation of the polymer-film surface prior to welding, the membrane filter may have efficiency from 5 to 40,000 kg/m²×D.

DETAILED DESCRIPTION OF THE INVENTION

It is known that permeability of a polymer material depends on a degree of crystallinity and morphology of the polymer. Crystalline structures in polymers are practically impermeable, and permeability of polymer depends mainly on its amorphous structure, which has arbitrary distribution in intercrystalline spaces of the polymer. Such "arbitrariness" leads to twisting of the diffusion path through polymer membranes. It is practically impossible to increase the share of the amorphous part in the volume of the amorphous-crystalline structures of a thin film that forms the outer surface of the membrane. In other words, it is practically impossible straighten aforementioned amorphous portion out in order to make it more permeable and comparable in thickness with the thickness of the film. However, in an amorphous-crystalline polymer film, the surface layer is amorphous to a higher degree than the inner material of the film. This is because in a phase transition from the melt to a solid state, a part of near-surface crystalline polymers, which have lower surface tension, tends to transfer to the amorphous state. (D. G. Gray, J. Polym. Science, B12 509, 1974).

The applicant has revealed that a filter membrane with a sufficiently homogeneous amorphous structure can be obtained by welding together two amorphous surfaces of polymer films so that the obtained structure can be used as an active zone of the filtering membrane. The aforementioned welding operation also is accompanied by transition from a melt to a solid body, but this transition also does not change the volume of the amorphous phase in the polymer (see V. Prutkin, et al. High-Molecular Compounds. Academy of Sciences of the USSR, Vol. XXV Б 1, p. 22, 1983). As a result, it would be possible to produce a filtering membrane with a straighten diffusion path, and the length of this path, i.e., the active zone of the membrane, will depend on the size of the molten zone obtained with the use of a welding tool, i.e., on the width of the heated zone. Thus the author arrived at the present invention.

Figure 1:
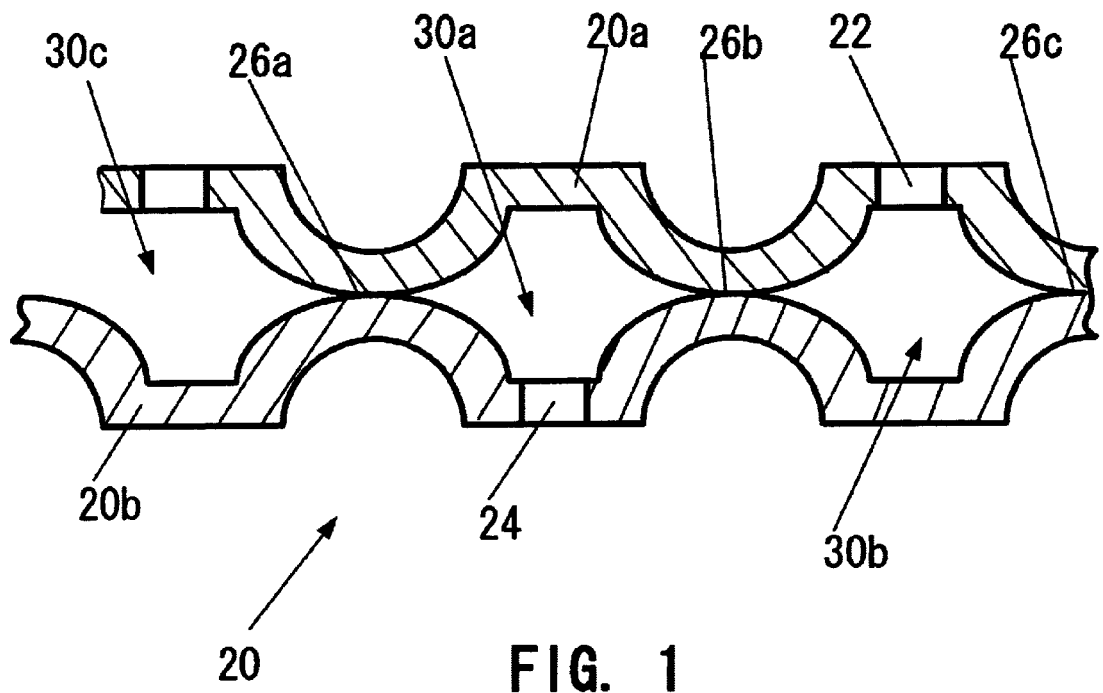
FIG. 1 is a fragmental sectional view of the filtering membrane of the invention.
Figure 2:
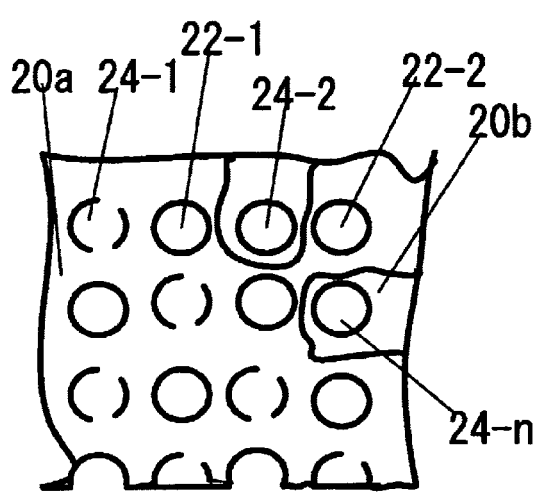
FIG. 2 is a top view illustrating arrangement of perforations in the membrane of FIG. 1.
Figure 3:
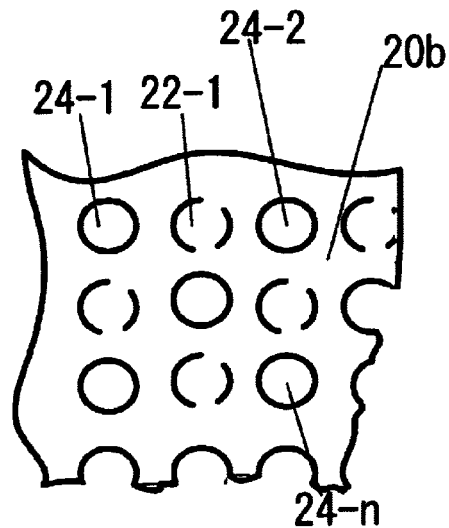
FIG. 3 is a bottom view of the membrane prior to welding illustrating arrangement of perforations formed in the lower film 20b.

The structure of the filtering membrane of the invention is shown in FIG. 1, which is a fragmental sectional view of the membrane. It can be seen that the membrane, which as a whole is designated by reference numeral 20 consists of two polymer films 20a and 20b applied one onto the other. The following materials are suitable for polymer films 20a and 20b: polystyrene polycarbonate, polyvinylchloride, polypropylene, and other thermoplastic materials. Each film has a plurality of perforations. Only one such perforation 22 is shown in the film 20a and only one such perforation 24 is shown in the film 20b in FIG. 1. Arrangement of perforations in the membrane 20 is shown in FIG. 2, which is a plan view on the membrane of FIG. 1 prior to welding. FIG. 3 is a bottom view of the membrane prior to welding illustrating arrangement of perforations formed in the lower film 20b.

Figure 4:
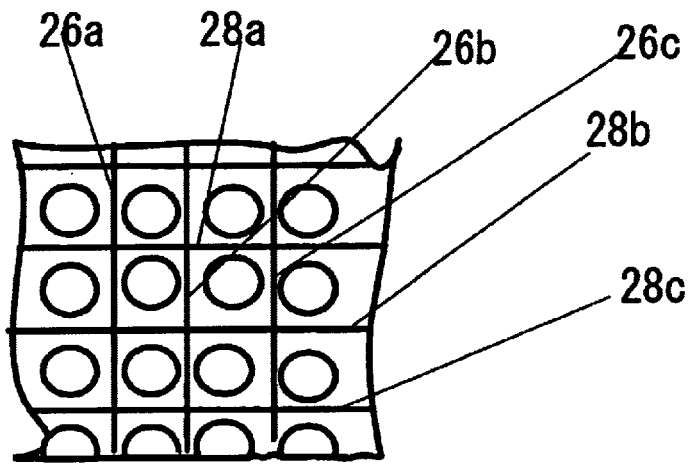
FIG. 4 is the top view of membrane of the invention after interconnection of the films by welding.

FIG. 4 is the top view of membrane 20 of the invention after interconnection of the films 20a and 20b by welding. It can be seen that welding seams 26a, 26b, 26c . . . and 28a 28b, 28c, . . . are arranged, e.g., in mutually perpendicular directions, so that the seams 26a, 26b, 26c . . . and 28a, 28b, 28c form a plurality of cells 30a, 30b, . . . (FIG. 1). Each aforementioned perforation 22 is arranged in each cell so that perforations 22-1, 22-2, . . . 22-n of the film 20a alternate with perforations 24-1, 24-2, . . . 24-n of another film 20b and are open in the direction opposite to that of perforations in the film 20a. In other words, the membrane 20 consists of a plurality of sealed cells having on one side of the membrane perforations open to the input side of the membrane and on the opposite side perforations open to the output side of the membrane. Adjacent cells are sealingly separated by the narrow welding seams 26a, 26b, . . . and 28a, 28b, . . . .

In order to enhance efficiency of the membrane, prior to welding, the surfaces of the polymer films are subjected to special physical and chemical treatment. Such treatment not only amorphosize the structure in the near-surface area, but also improves efficiency and selectivity of the membrane. This is achieved by stretching the films prior to welding in a surface-active medium. Such stretching creates crazes. The process of crazing is described in detail in U.S. Pat. No. 5,998,007 issued in 1999 to the same applicant. This method makes it possible to create a porous fibrillous structure (crazes) of different dimensions, which extends the surface amorphous structure deeper into the inner layers of the film. Such penetration into the film depth may reach up to 20% of the film thickness. The seams obtained after welding are used also as an active zone of the membrane. The crazes have a fibrillous structure and therefore they can withstand high shear stresses (see R.P. Kambour. Journal of Poly,. Sci., A2, 4165 (1964). This feature imparts to structures that contain crazes durability over a long period of use. Another important quality of crazes is that their dimensions can be adjusted by stretching the polymer. This property is reversible.

The crazes may have dimensions from 50 Angstroms to 100 μm. Therefore crazes can be formed in membranes of various types and functions. In order to fix dimensions of crazes in the vicinity of the welding seam, the polymer with crazes is welded in a stretched state to a non-stretched polymer.

An addition factor that provides stabilization and increase of dimensions of crazes consists in that during welding the medium captured inside the crazes is expanded under the effect of the welding heat, evaporates, opens the crazes, and thus expands their dimensions. This phenomenon makes it possible to control dimensions of the crazes.

Figure 5:
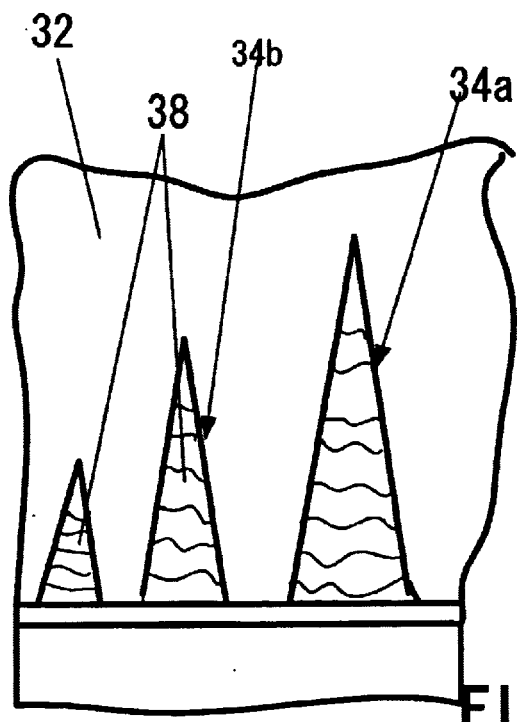
FIG. 5 is a cross section through the portion of the membrane of the invention illustrating crazes in the upper stretched and crazed film.

This condition is schematically shown in FIG. 5, where reference numeral 32 designates the upper film that contains crazes 34a, 34b, . . . , and reference numeral 36 designates a non-stretched film without crazes. The crazes contain fibrils 38, which cause reversible deformation. Welding of the film 32 to the film 36 fixes dimensions of the crazes 34a, 34b, . . . . It is shown that the greater are dimensions of crazes, the lower is density of the fibrils in its volume, and the higher is penetrability of the structures.

Figure 6:
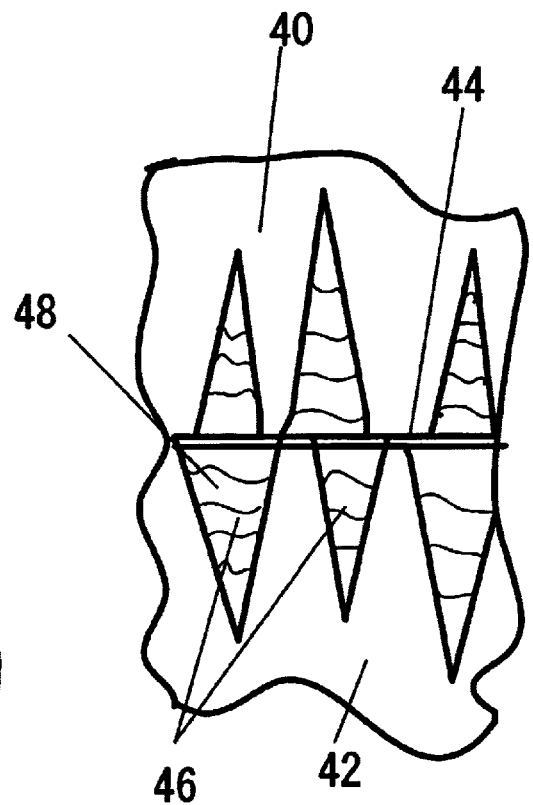
FIG. 6 is a cross section through the portion of the membrane of the invention illustrating crazes in the upper and lower stretched and crazed films, the crazed being filled with a solid substance.

Another method suitable for fixing dimensions of the crazes consists in filling the crazes with a dispersion medium and thus fixing their dimensions in the volume of the weld seams. The dispersion media may comprise thermo- or photostabilizers, indicators, substances that control passage of multiple-charge ions, etc. The aforementioned weld-seam structure is shown schematically in FIG. 6, where 40 and 42 designate the upper and lower films, respectively, and 34b, 34c designate crazes. Reference numeral 44 designates a weld seam, and 46 shows a solid dispersion filler introduced into the crazes 34b, 34c. As can be seen from FIG. 6, the solid filler 46 introduced into the craze maintains the crazes 34b, 34c in the vicinity of the weld seam with fixed dimensions.

At the time of welding, fused polymers of both films are joined to each other with the formation of an amorphous interphase layer. Formation of the interphase layer is accompanied by penetration of macromolecules from one film into the other via the phase-separation boundary. The thickness of the amorphous interphase layer increases with the increase in the time of contact and with the time approaches to the limit balance condition. This limit value of the thickness of the interphase layer is much higher in polymers which are thermodynamically compatible and is lower for thermodynaimically non-compatible polymer. This property opens new avenues for creating membranes from polymer mixtures.

In operation, the medium to be filtered diffuses from the input cells (e.g., such as cell 30b in FIG. 1) to the output cells (e.g., such as cell 30b in FIG. 1) of the membrane 20 through the material of the welding seams 26a, 26b . . . 28a, 28b . . . . Filtering is enhanced if the material of the seams 26b 26a, 26b . . . 28a, 28b . . . aforementioned crazes. In such a membrane, the total length of the welding seams on the area of 1 m$^2$ may reach several hundred thousand meters. The membrane possesses selectivity sufficient for separation of two or multiple-component mixtures in a single-stage process. Depending on the method used for preparation of the polymer-film surface prior to welding, the membrane filter may have efficiency from 0.1 m$^3$/m$^2$×D to 3 m$^3$/m$^2$×D. In reality, the membrane cells are flat as the films are merely stacked one onto the other. However, as shown in FIG. 1, when the medium to be filtered is fed to the input cells, such as cell 30b (FIG. 1) under pressure (this pressure may be caused just by gravity of the liquid medium), the cell is increased in volume.

Figure 7:
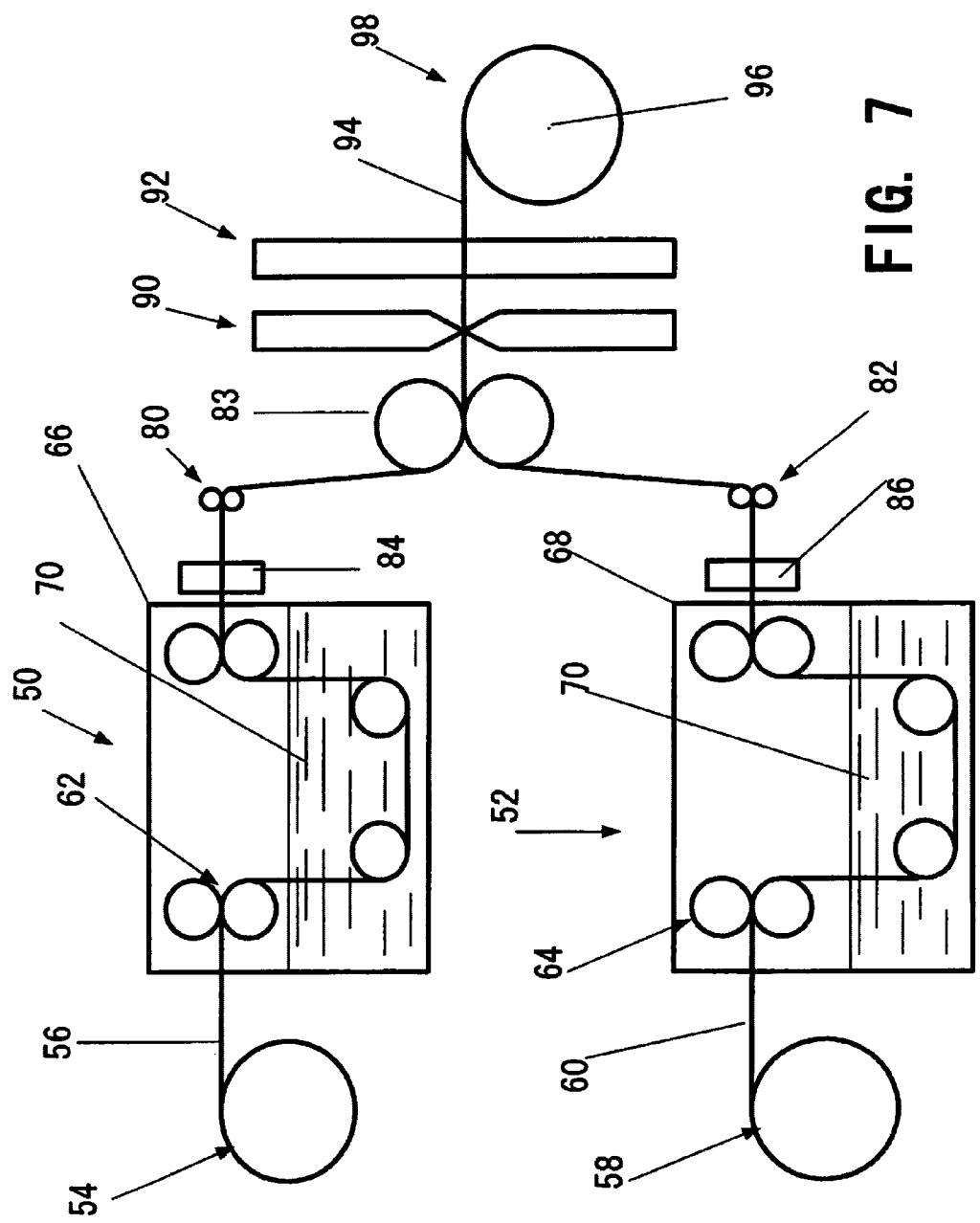
FIG. 7 is a schematic view of an apparatus for manufacturing membranes of the invention.

FIG. 7 illustrates an apparatus for manufacturing membranes of the invention. The apparatus consists of two parallel sections 50 and 52 for the upper and lower films, respectively. The section 50 has a feeding coil 54 of an upper film 56, and the section 52 has a feeding coil 58 of a lower film 60. With the use of feeding rollers 62 and 64 the films 56 and 60 are fed to containers 66 and 68, respectively. The containers 66 and 68 are filled with a surface-active medium 70 such as isopropyl, amyl, isoamyl, ethyl alcohols, chlorophorm, and other surface-active media. Located in the containers 66 and 68 inside the surface-active medium 70 are guide rollers 72 and 74 and pulling rollers 76 and 78, respectively. Speeds of the films 56 and 60 depend on the rotation frequency of feed rollers 62, 64 and pulling rollers 76, 78. The films 56 and 60 are stretched due to the fact that the rotation frequency of feed rollers 62, 64 is lower than the rotation frequency of pulling rollers 76, 78. It is recommended that the films be stretched to 10 to 40%. If the stretching ratio is lower than 10% the efficiency of filling of crazes will be low. If, on the other hand, the stretching ratio exceeds 40%, the film can be broken.

Upon exit from the containers 66 and 68, the films are guided between pulling rollers 80, 82, respectively. On their way from the containers 66, 68 to the pulling rollers 80, 82, the films 56, 60 pass through respective perforation devices 84 and 86 which punch holes, such as the holes 22-1, 22-2, . . . 22-n, 24-1, 24-2, . . . 24-n shown in FIGS. 2 and 3. With the use of pulling rollers 80 and 82 positions of holes are adjusted so that during subsequent welding the holes 22-1, 22-2, . . . 22-n of the film 56 do not coincide with the holes 24-1, 24-2, . . . 24-n of the film 60. In such a misaligned positions the films are fed with the use of connecting roller 83 to a welding unit 90 where they are welded with the formation of transverse weld seams of the type shown in FIG. 2 by reference numerals 26a, 26b, 26c . . . . If necessary, longitudinal weld seams, such as weld seams 28a, 28b, 28c, . . . can be formed by means of a welding unit 92. The endless membrane belt 94 formed as a result of the process described above is wound onto a receiving roller 96 to form a coil 98.

The pitch between the welding seams and width of the welding seam are selected with reference to many factors such as purpose of the filter, type of the medium to be filtered, target efficiency of the filter, etc. In general, however, the width of the welding seam can vary within the range from 50 microns to 100 microns. If the width of the seam is smaller than 50 microns, the welding apparatus will require the use of special welding tools such as laser beam, etc. If, on the other hand, the width of the seam is wider than 100 microns, the filter will operate with low efficiency because of an increase diffusion resistance. The pitch between the welding seams determines total length of the welding seam. Decrease in the pitch between the welding seams increase productivity of the membrane. In general, the pitch should be at least 5 times the width of the seam.

EXAMPLE 1

A welded-structure membrane was made from an extruded low-density polyethylene (LDPE) film having a thickness of 40 microns. The aforementioned LDPE film had the following characteristics:

TABLE 1

| Characteristics | Value | ASTM Test Method |
| --- | --- | --- |
| Density, g/cc | 0.92 | D1505 |
| Tensile Strength at Yield, % | 1400 p.s.i. (9.6 MPa) | D638 |
| Elongation at Yield, % | 500 | D638 |

Schematic images of the films correspond to those shown in FIGS. 2 and 3, where perforations 22-1, 22-2, . . . 22-n and 24-1, 24-2, . . . 24-n had diameters equal to 0.06 mm. The films were interposed one onto the other so that openings of both films are not aligned. In such position the films were welded together. Welding was carried out by a thermal-pulse method with a 0.05 MPa pressure applied from the tool to the film and with duration of heating about 0.1 sec. Welding seams 26a, 26b, 26c . . . and 28a, 28b, 28c, . . . were arranged in mutually perpendicular directions. Pitch between welding seams was equal to 0.5 mm. The weld seams had a width of 50 microns. Permeability and selectivity tests were carried out on 10 cm×10 cm membranes with the total length of welding seam equal to 400 cm. This means that 1 m² will have the total length of all welding seams equal to 40,000 cm. The medium separated with the use of the test filter was a 50:50 mixture of toluene and isobutanol. Treatment was carried out at 20° C. Analysis of the separated components was carried out by gravitation, spectral, and chromatographic methods. For comparison, the same mixture was separated with the membrane made from a continuous film without welding seams. The test has shown that at separation coefficient equal to 4, penetrability through 1 cm long welding seam corresponded to 0.002 g/hr. In this case, penetrability through one 1 m² membrane with the 40,000 cm total length of the welding seam during 24 hours (D) will be equal to:

$$1.9 \text{ kg/m}^2 \times D$$

EXAMPLE 2

A welded-structure membrane of the type shown in FIG. 1 was made from a plasticized polyvinylchloride (PVC) film having a thickness of 80 microns. The aforementioned PVC film had the following characteristics:

TABLE 2

| Characteristics | Value | Test Method |
| --- | --- | --- |
| Density, g/cc | 1.28 | DIN 53479 |
| Tensile Strength at Yield, % | 50 MPa | ASTM D638 |
| Elongation at Yield, % | 80 | ASTM D638 |

For amorphization of the film surface, prior to welding the film was stretched in a isopropyl alcohol at 20° C. on an installation of the type shown in FIG. 7. The films were treated in accordance with the procedure described above with the distinction that only one film, i.e., the film 56, was stretched at a rate of (1 to 5)×$10^{-2}$/min. Speed of stretching was controlled by means of the pulling roller 76. The film was stretched with elongation of 20%. The volume of crazes formed in the surface area of the film 56 was 0.19 cm³ per 1 cm³ of the volume in the initial film.

Perforations than has been made in both films 58 and 60 with the use of the perforation device 84 and 86. The films were pulled with the use of pulling roller 80 and 82 so that to prevent alignment of the punched holes in both films, as shown by holes 22 and 24 in FIG. 1. Welding conditions were the same as in Example 1.

The test has shown that at separation coefficient equal to 4, penetrability through 1 cm long welding seam corresponded to 0.05 g/hr. In this case, penetrability through one 1 m² in membrane with the 400000 cm total length of the welding seam during 24 hours (D) will be equal to:

$$48 \text{ kg/m}^2 \times D$$

EXAMPLE 3

Samples of the membranes were prepared by the same method as in Example 2, with the exception that both films, i.e., the film 60 and the film 56 were stretched in a surface-active medium containing 5% channel black with the particle size of 250 Angstroms. The structure of the materials in the area near welding seam was similar to the one shown in FIG. 6, where reference numeral 44 designate the welding and where reference numeral 46 designates particles of the channel black within the volume of the crazes 34b. All further operations associated with manufacturing of the membranes and with their test were the same as in Example 2.

The test has shown that at separation coefficient equal to 4, penetrability through 1 cm long welding seam of isopropyl alcohol corresponded to 0.7 g/hr, while the channel black was separated in an amount of 97–98%. In this case, penetrability through one 1 m² membrane during 24 hours (D) will be equal to:

$$672 \text{ kg/m}^2 \times D.$$

With all other conditions being unchanged, decrease in the pitch between the welding seams and hence the increase in the total length of all welding seams produced the results shown in the following Table 3.

TABLE 3

| Example No. | Specific penetrability (g/cm) | Pitch between the seams (cm) | Diameter of the holes (cm) | Total length of all seams (cm) | Productivity (kg/m² × D) |
| --- | --- | --- | --- | --- | --- |
| 4 | 0.002 | 0.1 | 0.02 | 200,000 | 9.6 |
| 5 | 0.05 | 0.1 | 0.02 | 200,000 | 240 |
| 6 | 0.7 | 0.1 | 0.02 | 200,000 | 3360 |
| 7 | 0.002 | 0.01 | 0.002 | 2,000,000 | 96 |
| 8 | 0.05 | 0.01 | 0.002 | 2,000,000 | 2400 |
| 9 | 0.7 | 0.01 | 0.002 | 2,000,000 | 33600 |

Thus it has been shown that present invention provides membranous filters which have controlled distribution and orientation of pores, short filtration paths, efficient operation, simple construction, and low cost. The invention also provides filtering membranes, which can be manufactured in a single-stage process. Another object is to provide a simple single-stage method for manufacturing the aforementioned membranes.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the membrane films can be made of material different from those mentioned in the specification. The crazes may have geometry and different from the one shown in the drawings. The crazes may have different dimensions. The crazes can be filled with various solid, gaseous, or liquid substances which are different from those mentioned in the specification. The crazes may be filled with electrically charged particles. The walls of the crazes may be metallized and function as electrodes. The opening in the membranes may be oval, square, triangular, etc. The seams may be non-linear and non-parallel. The films can be made from different polymer materials or mixtures thereof. Dimensions of the crazes may be controlled not necessarily in one surface-active medium but also in another medium after the first one. Stretching can be carried out in a multiple-stage manner.

What is claimed is:

1. A filtering membrane for separation of one substance from another substance, wherein at least one of said substances is a fluid, said membrane comprising:
   a first film made from a polymer material;
   a second film made from a polymer material;
   a plurality of welding seams that connect said first film to said second film and form at least a first closed cell and a second closed cell, said first closed cell and said second closed cell being interconnected through said welding seams penetrable only to said one substance and not penetrable to said another substance;

said first closed cell having an inlet opening formed in said first film for the supply of said one substance and another substance into said first cell, said second closed cell having an output opening formed in said second film for discharge of said one substance penetrated into said second closed cell through said welding seams;

said welding seams having a structure, which at least partially is an amorphous structure;

at least one of said first film and said second film having crazes.

2. The filtering membrane of claim 1, wherein said crazes are filled with a craze-filling material selected from a group consisting of a solid material, a liquid material, and a gaseous material.

3. The filtering membrane of claim 2, wherein said craze-filling material is selected from a group consisting of a material for controlling dimensions of said crazes, a treating material for treating said one substance, a material for treating said another substance, and a material for treating both said first substance and said another substance.

4. The filtering membrane of claim 3, wherein said liquid material is a material with a high coefficient of thermal expansion for expanding the volume of said crazes during said welding.

5. The filtering membrane of claim 3, wherein said treating material is an electrically charged material.

6. The filtering membrane of claim 1, wherein said amorphous structure comprises more than 50% of said structure.

7. The filtering membrane of claim 6, said amorphous structure comprises 100% of said structure.

8. A filtering membrane for separation of one substance from another substance, wherein at least one of said substances is a fluid, said membrane comprising:

a first film made from a polymer material; a second film made from a polymer material;

a plurality of welding seams that connect said first 51m to said second film and form at least a first closed cell and a second closed cell, said first closed cell and said second closed cell being interconnected through said welding seams penetrable only to said one substance and not penetrable to said another substance;

said first closed cell having an inlet opening formed in said first film for the supply of said one substance and another substance into said first cell, said second closed cell having an output opening formed in said second film for discharge of said one substance penetrated into said second closed cell through said welding seams;

said welding seams having a structure, which at least partially is an amorphous structure;

said polymer material of said first film and said polymer material of said second film being selected from the same polymer materials and different polymer materials;

said polymer material of said first film and said polymer material of said second film being thermoplastic polymer materials;

at least one of said first film and said second film having crazes.

9. The filtering membrane of claim 8, wherein said crazes are filled with a craze-filling material selected from a group consisting of a solid material, a liquid material, and a gaseous material.

10. The filtering membrane of claim 9, wherein said craze-filling material is selected from a group consisting of a material for controlling dimensions of said crazes, a treating material for treating said one substance, a material for treating said another substance, and a material for treating both said first substance and said another substance.

11. The filtering membrane of claim 10, wherein said liquid material is a material with a high coefficient of thermal expansion for expanding the volume of said crazes during said welding.

12. The filtering membrane of claim 10, wherein said treating material is an electrically charged material.

* * * * *